(12) United States Patent
Baasch et al.

(10) Patent No.: US 7,500,933 B2
(45) Date of Patent: Mar. 10, 2009

(54) TRANSMISSION AND DRIVE TRAIN FOR A VEHICLE

(75) Inventors: Detlef Baasch, Friedrichshafen (DE); Gerhard Gumpoltsberger, Friedrichshafen (DE); Christoph Pelchen, Tettnang (DE); Barbara Schmohl, Friedrichshafen (DE); Ulrich Mair, Friedrichshafen (DE); Thomas Rosemeier, Meckenbeuren (DE)

(73) Assignee: ZF Friedrichshafen AG, Friedrichshafen (DE)

(*) Notice: Subject to any disclaimer, the term of this patent is extended or adjusted under 35 U.S.C. 154(b) by 318 days.

(21) Appl. No.: 10/574,593

(22) PCT Filed: Oct. 14, 2004

(86) PCT No.: PCT/EP2004/011528

§ 371 (c)(1),
(2), (4) Date: Apr. 4, 2006

(87) PCT Pub. No.: WO2005/043008

PCT Pub. Date: May 12, 2005

(65) Prior Publication Data

US 2007/0015618 A1 Jan. 18, 2007

(30) Foreign Application Priority Data

Oct. 22, 2003 (DE) ................ 103 48 960

(51) Int. Cl.
 *F16H 37/08* (2006.01)
 *F16H 48/30* (2006.01)
 *F16H 37/02* (2006.01)

(52) U.S. Cl. .............. 475/205; 475/150; 475/219

(58) Field of Classification Search ............ 475/5, 475/6, 28, 84, 150, 151, 153, 221, 198, 199, 475/204, 205, 208, 209, 211, 210, 214, 215, 475/216, 218, 219; 180/248
See application file for complete search history.

(56) References Cited

U.S. PATENT DOCUMENTS

| 4,457,394 A | 7/1984 | Suzuki |
| 4,471,669 A | 9/1984 | Seaberg |
| 4,497,218 A * | 2/1985 | Zaunberger ............ 475/18 |
| 4,641,548 A | 2/1987 | Greenwood |

(Continued)

FOREIGN PATENT DOCUMENTS

DE 32 23 836 A1 2/1983

(Continued)

*Primary Examiner*—Roger Pang
(74) *Attorney, Agent, or Firm*—Davis & Bujold, P.L.L.C.

(57) ABSTRACT

A transmission for distributing a drive torque to two drive output shafts, with two planetary gearsets each having at least three shafts. A respective shaft of a planetary gearset is connected to a drive input shaft. Furthermore, one shaft of each planetary gearset constitutes one of the output shafts and in each case at least one further shaft of a planetary gearset is connected with a shaft of another planetary gearset. An operation-status-dependent torque of one shaft can be supported by the connection, depending on an operating status of the other shaft connected thereto, in such manner that when there is a rotation speed difference between the output shafts, a speed-difference-changing torque is applied to the planetary gearsets. Furthermore, a drive train is proposed, in which a drive torque from a drive-power-source is distributed variably in the longitudinal and transverse direction of the vehicle in an operation-status-dependent manner.

3 Claims, 12 Drawing Sheets

U.S. PATENT DOCUMENTS

| | | | |
|---|---|---|---|
| 4,776,236 A * | 10/1988 | Gleasman et al. | 475/6 |
| 4,819,512 A | 4/1989 | Azuma et al. | |
| 5,135,071 A | 8/1992 | Shibahata et al. | |
| 5,195,600 A * | 3/1993 | Dorgan | 180/9.1 |
| 5,692,987 A | 12/1997 | Shibahata et al. | |
| 6,098,737 A | 8/2000 | Aoki | |
| 6,206,798 B1 | 3/2001 | Johnson | |
| 6,336,513 B1 * | 1/2002 | Hasegawa et al. | 180/6.2 |
| 2003/0079954 A1 * | 5/2003 | Murakami et al. | 192/82 T |
| 2004/0220011 A1 * | 11/2004 | Gumpoltsberger et al. | 475/205 |

FOREIGN PATENT DOCUMENTS

| | | |
|---|---|---|
| DE | 40 00 667 A1 | 7/1990 |
| DE | 100 29 603 A1 | 3/2001 |
| EP | 0 533 921 A1 | 3/1993 |
| EP | 0 703 109 A1 | 3/1996 |
| JP | 62295729 | 12/1987 |
| JP | 06 297977 A | 10/1994 |
| JP | 2002-172946 | 6/2002 |
| WO | WO-02/09966 A1 | 2/2002 |
| WO | WO-2004/005754 A2 | 1/2004 |

* cited by examiner

TRANSMISSION AND DRIVE TRAIN FOR A VEHICLE

This application is a national stage completion of PCT/EP2004/011528 filed Oct. 14, 2004 which claims priority from German Application Serial No. 103 48 960.6 filed Oct. 22, 2003.

FIELD OF THE INVENTION

The invention concerns a transmission for distributing a drive torque to at least two drive output shafts with at least two planetary gearsets each having at least three shafts and a drive train of a vehicle having a power source, at least two driven vehicle axles and a transmission.

BACKGROUND OF THE INVENTION

In vehicles known from prior practice, a drive torque produced by a power source or drive engine is transmitted by a transmission device to the drive wheels of a driven vehicle axle, as necessary. Where vehicles, such as all-wheel passenger cars or all-wheel-drive goods vehicles, are made with more than one driven axle, the power of the engine in the drive train of such a vehicle has to be distributed among the driven vehicle axles.

For this power distribution so-termed differentials are used, which are located in the drive train of a vehicle downstream from a main gearbox provided so that various gear ratios can be engaged. For the longitudinal distribution of the engine's drive power to several driven axles of a vehicle, so-termed longitudinal differentials are used. In addition, so-termed transverse differentials or equalization transmissions are used for the transverse distribution of the drive power between two drive wheels of a vehicle axle.

With the help of such distributor transmissions, a drive torque can be distributed between several driven axles in any desired proportions without producing stresses in a drive train. Moreover, the use of differentials enables the drive wheels of a driven vehicle axle to be driven with different rotation speeds independently of one another in accordance with the different path lengths of the respective left and right driving tracks, whereby the drive torque can be distributed to both drive wheels symmetrically and thus without any yaw torque.

However, these two advantages are offset by the drawback that because of the equalizing action of a differential, the propulsive forces that can be transferred to the road by two drive wheels of a vehicle axle or from two or more driving axles is determined in each case by the lower or lowest transferable drive torque of the two drive wheels or driving axles. This means that when, for example, a drive wheel resting on smooth ice skids, no torque higher than that of the skidding drive wheel can be supplied to the other drive wheel, even when the latter is on ground that it could grip. In such a driving situation, the vehicle might disadvantageously not be able to start off because of the equalizing action of a differential, which allows a difference of speed between two drive output shafts of the differential.

Accordingly in practice, it has become customary to prevent equalization movement of a differential by suitable means in the event of critical driving situations. This is done, for example, by a differential lock, known as such, which can be actuated manually or automatically by mechanical, magnetic, pneumatic or hydraulic means and which fully prevents any equalization movement by blocking the differential.

Furthermore, automatically lacking differentials, also known as equalizing transmissions with limited slip or locking differentials, are used. Such equalizing transmissions make it possible to transfer a torque to a drive wheel of a driven vehicle axle or to a driven vehicle axle even when the other drive wheel, or if there are several driven axles the other driven axles, are skidding because of poor grip on the ground. At the same time, however, the advantage of the above-mentioned yaw-torque-free force transmission is lost and the free adaptation of the wheel rotation speeds to the path lengths of the two driving tracks of the two wheels of a driving axle is also disadvantageously prevented.

WO 02/09966 A1 discloses a transmission for a four-wheel-drive vehicle, in which an input shaft is connected to a planetary gearset. Here, the planetary gearset is made as a three-shaft planetary gearset, such that an annular gear wheel is in active connection with the input shaft, a solar gear wheel with a first drive output shaft, and the planetary carrier with a planetary gear system and with another drive output shaft of the transmission. The planetary gear system comprises three solar gear wheels and three planetary gears each of which meshes with one of the solar gear wheels, which are made integrally with one another and have a common planetary carrier. The planetary carrier of the planetary gear system and one of its solar gear wheels are each in active connection with a brake. These brakes are connected to a force supply and being operated independently of one another and controlled by an electronic control device. To the electronic control device are connected a plurality of sensors, whose signals are received by the electronic control device and converted into corresponding control signals for the two clutches. Depending on the control of the two clutches, the initial speed and the torque transmitted to the front axle and the drive output speed of the planetary gear system and the torque transmitted to the rear axle are adjusted.

However, this all-wheel distributor system, known from the prior art, has the disadvantage that variable torque distribution can only be effected to a limited extent and that its design is elaborate. Owing to its elaborate design, the all-wheel distributor system has large overall dimensions so the all-wheel distributor system takes up more structural space and has a high inherent weight.

Accordingly, the purpose of the present invention is to provide a transmission of simple design that can be made inexpensively and a drive train of a vehicle by way of which a degree of distribution of a drive torque can be varied, as necessary, between at least two driven vehicle axles or between two drive wheels of a driven vehicle axle in such a manner that driving operation of a vehicle is ensured even in critical driving situations.

SUMMARY OF THE INVENTION

The transmission according to the invention is a system of simple design with small overall dimensions, which can be made inexpensively and also takes up little structural space.

This is achieved by the feature that the two first shafts of the planetary gearsets, which are connected to a drive input shaft, are also connected to one another at least by a gear wheel mounted on the housing. The force input to the transmission, which takes place in the distributor transmission devices known from the prior art by way of a ring gear of large diameter, is provided at most at the outer diameter of the two planetary gearsets in the transmission design. In a simple manner, this reduces the diameter of the transmission, according to the invention, compared with those of distributor transmissions known from current practice, without essentially enlarging the external dimensions of the transmission in the axial direction.

An alternative and also structural-space-optimized transmission, according to the invention, the active connection between the respective third shafts of the first and second planetary gearsets is formed by a third planetary gearset, one of the shafts of the third planetary gearset being fixed on the housing. Owing to the arrangement of the third planetary gearset between the two third shafts of the first and second planetary gearsets, a basic distribution of the drive torque between the two output shafts of the transmission, which depends on the transmission ratio of the third planetary gearset, is first produced. This can then be varied, as necessary, and in a manner that depends on the operating status by various means in a simple way, such as by introducing a torque into the active connection via one of the shafts of the third planetary gearset.

In the transmission of the invention, the drive torque can be distributed variably between the two drive output shafts by continuous adjustment of the transmission ratio of a continuously variable ratio device comprised in the active connection.

This provides the advantageous possibility of distributing a drive torque from a drive engine between the two output shafts by way of operating-status-dependent control and regulation of the transmission ratio of the continuously variable ratio device of the active connection with continuously adjustable degrees of distribution between an upper and a lower limit value of a degree of distribution of the drive torque delivered to the transmission.

With the drive train for a vehicle comprising a power source with at least two driven vehicle axles and at least one transmission according to the invention as described above, which is arranged so as to enable the distribution, as necessary, and in an operating-status-dependent manner, of the drive torque from the power source between the driven vehicle axles in a power path between the power source and the vehicle's axles and/or in a power path of a vehicle axle for the distribution, as necessary, and in an operating-status-dependent manner, of the fraction of the drive torque delivered to the axle in the transverse direction of the vehicle between two drive wheels of the vehicle's axle. The possibility is given, on the one hand, of continuously distributing a drive torque in the longitudinal and/or the transverse direction of the vehicle and, on the other hand, of constructing a vehicle with a structural-space-optimized and inexpensive drive train. In particular, the structural-space-optimized and inexpensive design of the drive train reduces the overall production cost of a vehicle and leaves more structural space free in the area of the drive train, where little structural space is usually available in vehicles, compared with solutions known from current practice.

BRIEF DESCRIPTION OF THE DRAWINGS

The invention will now be described, by way of example, with reference to the accompanying drawings in which to improve clarity in the description of the various example embodiments, the same numbers are used for components having the same structure and function. The Figures show.

DETAILED DESCRIPTION OF THE INVENTION

Figure 1:
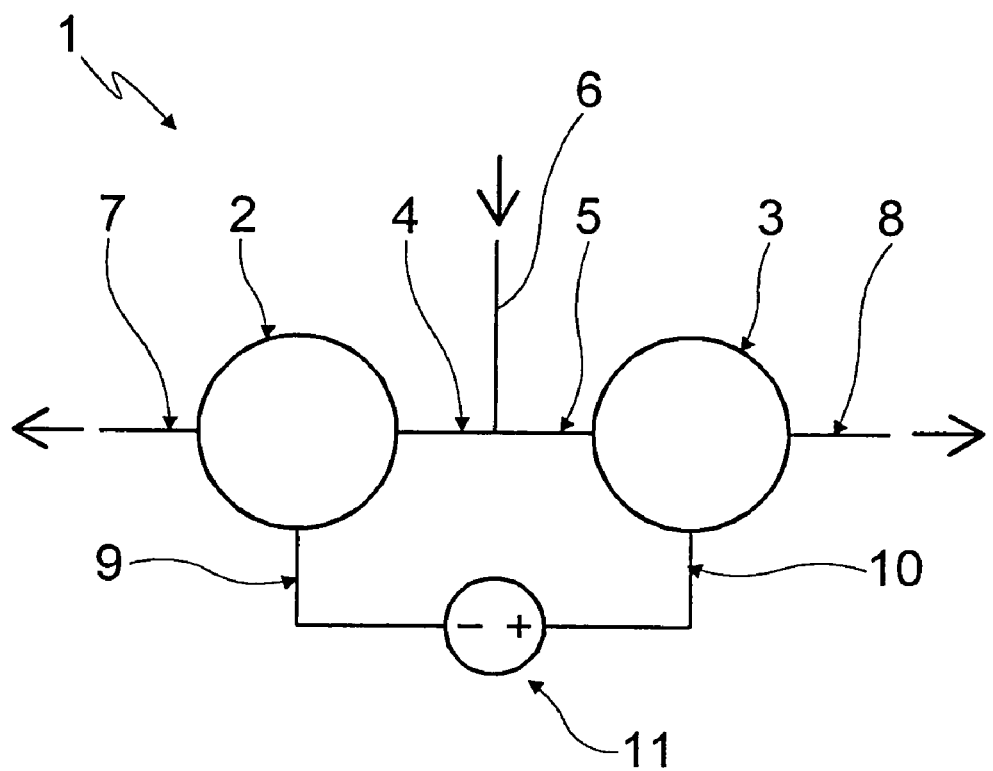
FIG. 1 is a basic layout scheme of a transmission according to the invention.

Referring to FIG. 1, a basic layout of a transmission or transmission device 1 is shown, which can be used as a differential in a power path of a vehicle's drive train between a power source and the driven vehicle axles for the longitudinal distribution of a drive torque from the power source between at least two driven axles, or in a power path of at least one of the driven vehicle axles for the transverse distribution of a fraction of a drive torque delivered to a driven vehicle axle between two drive wheels of that axle.

The transmission 1 is configured with a first planetary gearset 2 and a second planetary gearset 3 which, depending on the respective application concerned, can be made as minus, plus, bevel gear or sequential planetary gearsets. In each case, a first shaft 4, 5 of the two planetary gearsets 2, 3 is connected to a drive input shaft 6, which constitutes a transmission output shaft of a main gearbox (not shown) of the drive train. In each case, second shafts 7 or 8 of the two planetary gearsets 2, 3, respectively, constitute drive output shafts of the transmission 1, which are in active connection either with the driven vehicle axles or with the drive wheels of one vehicle axle. A third shaft 9 of the first planetary gearset 2 and a third shaft 10 of the second planetary gearset 3 are connected to one another via an active connection 11.

The active connection 11 is designed such that an operating-status-dependent torque of the third shaft 9 of the first planetary gearset 2 or of the third shaft 10 of the second planetary gearset 3, depending on an operating status of the third shaft 10 of the planetary gearset 3 or of the third shaft 9 of the first planetary gearset 2, can be supported in such manner that if a difference in speed occurs between the output shafts 6, 7, by virtue of the active connection 11 a torque that influences the said speed difference is applied to the planetary gearsets 2 and 3 or to the respective third shafts 9 and 10 thereof.

For this purpose the active connection can be configured in the manner described in greater detail below alternatively or in combination with a speed inversion between the two shafts 9 and 10 in active connection with one another, a continuously variable transmission ratio device, with a torque source to increase or reduce a torque on at least one of the two shafts 9 and 10 in active connection with one another, and/or a third planetary gearset.

Figure 2:
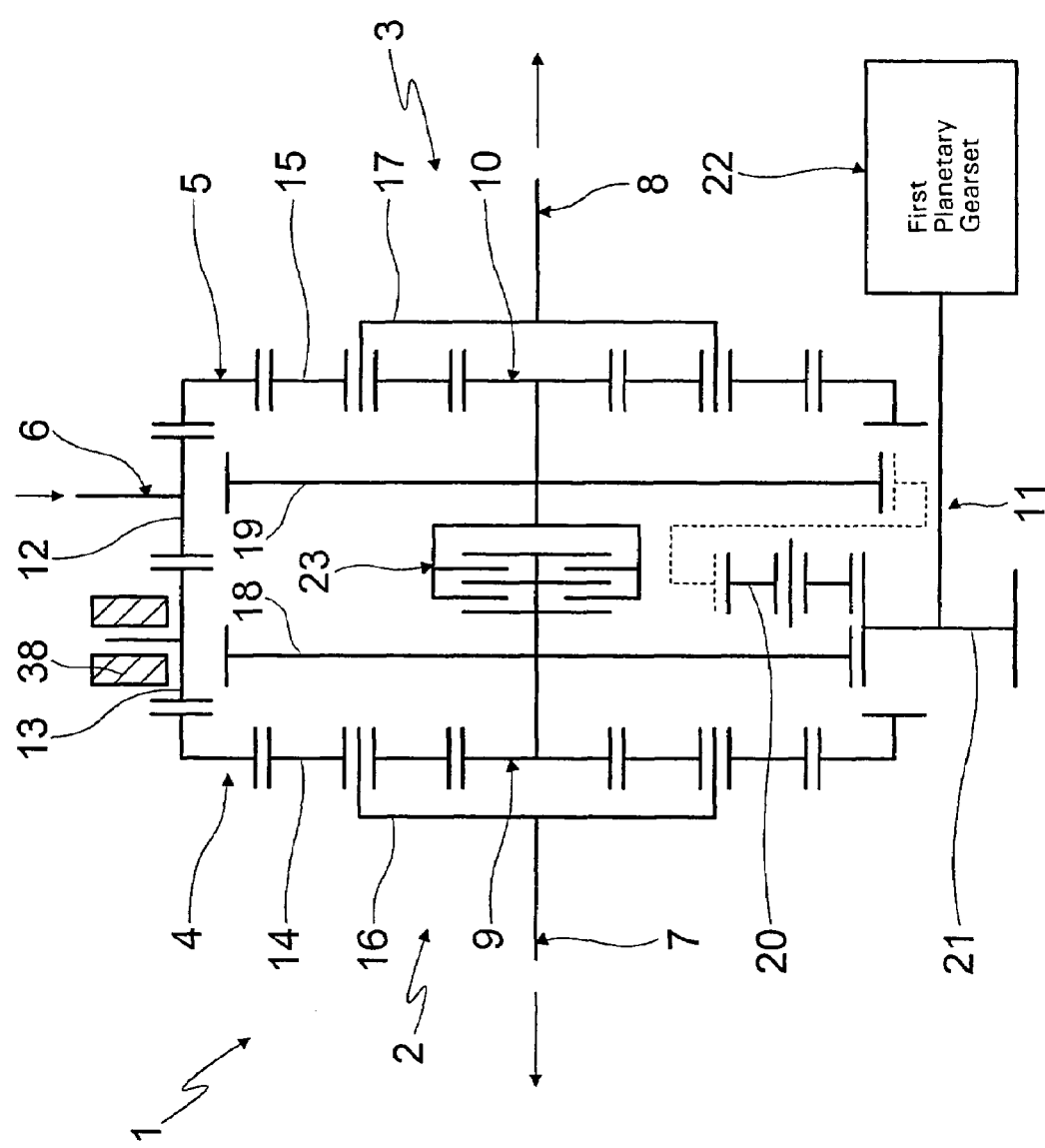
FIG. 2 is a gear layout of a transmission according to the invention made as an axle differential in which the active connection between the two planetary gearsets comprises spur gear inversion and an electric motor.

FIG. 2 shows a gear layout of a first example embodiment of the transmission 1, according to the invention, whose basic layout is shown in FIG. 1. A drive torque from the drive shaft 6 is transmitted by a first spur gear 12 connected thereto to the first shaft 5 of the second planetary gearset 3 made as an annular gear. Furthermore, the drive torque from the drive shaft 6 is transmitted by the first spur gear 12 and a second spur gear 13 mounted on the housing to the first shaft 4 of the first planetary gearset 2, which is also made as an annular gear. From there on, the drive torque from the drive shaft 6 is transmitted to planetary gear wheels 14 and 15 engaged with the two annular gears 4 and 5, each respectively mounted to rotate on a web 16 or 17 and driving the two webs 16 and 17 by virtue of their rolling movement in the annular gears 4 and 5.

The two webs 16 and 17 of the planetary gearsets 2 and 3 are, in turn, connected to the two drive output shafts 7 and 8, so that the drive torque transmitted via the first and second spur gears 12, 13, the two annular gears 4 and 5, the planetary gear wheels 14 and 15 and the webs 16 and 17, is transferred to the two output shafts 7 and 8.

The connection of the two planetary gearsets 2 and 3 to a crankshaft of an internal combustion engine, i.e., in the present case to the drive shaft 6, is effected in this case by respective crown gears provided between the first spur gear 12 and the annular gear 5 of the second planetary gearset 3 and between the second spur gear 13 and the annular gear 4 of the first planetary gearset 2. Accordingly, there is direct engagement between the power source and the two planetary gearsets or the third shafts 9 and 10 of the planetary gearsets 2 and 3, which are made as solar gears.

In addition, the planetary gear wheels 14 and 15 mesh, respectively, with the solar gears or third shafts 9 and 10 of the planetary gearsets 2 and 3, which are respectively connected to a third spur gear 18 and a fourth spur gear 19. The two spur gears 18 and 19 of the third shafts 9 and 10 of the two planetary gearsets 2 and 3 are connected to a fifth spur gear 20, so that there is a mechanical connection between the solar gears 9 and 10 of the planetary gearsets 2 and 3.

This means that the active connection 11, in the example embodiment of the transmission 1 according to FIG. 2 shown only schematically in FIG. 1, comprises the third spur gear 18, the fourth spur gear 19, the fifth spur gear 20 and a sixth spur gear 21, which is connected to a device 22 for applying a torque to one of the shafts 9, 10 in active connection with one another. The device 22 for applying a torque or torque source, is coupled via the sixth spur gear 21 to the two solar gears 9 and 10 and consists of an electric motor in the present case.

The design of the active connection 11 with the torque source 22 makes it possible, in an operating-status-dependent manner and depending on the rotation direction of the electric motor, to apply a torque to the actively connected solar gears 9 and 10 such that, for example, if there is a rotation speed difference of the transmission 1 between the two output shafts 7 and 8, an equalizing action of the transmission 1 between the two output shafts 7 and 8 is reduced or increased. In other words, by way of the torque source 22, a controlled torque increase or torque reduction can be applied to the two actively connected solar gears or third shafts 9 and 10 of the planetary gearsets 2 and 3, for example, to counteract any oversteering or understeering while driving round a bend by increasing the speed difference between the drive wheels of a driven axle effectively and in a simple manner.

Furthermore, the sensitivity of a vehicle to side wind can be improved by controlled adjustment of a speed difference between the two output shafts and thus also between two drive wheels on a vehicle axle.

Alternatively, the torque source 22 can also be made as a hydraulic drive or some other suitable drive machine. Moreover, it is also obviously possible to provide one or more ratio steps between the torque source 22 and the sixth spur gear 21 in order to be able to apply the controlled torque increase or reduction, as necessary, to the active connection 11 or to the two actively connected third shafts 9 and 10 of planetary gearsets 2 and 3. The torque source 22 is controlled, regardless of whether the design has additional ratio steps by a control device (not illustrated), which is integrated in a transmission control device of the transmission 1 or which can be made as a separate control unit. The transmission ratios between the individual spur gear pairs of the active connection 11 should have the same value.

If the transmission 1 represented in FIG. 2 is used as an axle differential for distributing the drive torque to two drive wheels of a driven vehicle axle then, when road conditions are unfavorable, this can lead to a situation in which one drive wheel connected with the output shaft 7 skids on smooth ground while a drive wheel connected with the output shaft 8 remains almost motionless because of good grip on the ground. In such an operating condition of the transmission 1, there is a large speed difference between the two output shafts 7 and 8, as a result of which the two solar gears 19 and 20, which are stationary when the speeds of the two output shafts 7 and 8 are equal, now rotate in different rotation directions. On account of their inertia, the rotating masses of the active connection 11 and also that of the unenergized torque source 22 made as an electric motor counteract this speed difference, particularly at the beginning of the wheel spin, in such a manner that part of the drive torque from the drive shaft 6 is transferred to the output shaft 8 and starting off is made possible.

If it is desired to influence the equalizing action of the transmission 1 between the two output shafts 7 and 8 actively in a controlled way that depends on the driving situation, the design of the active connection 11 between the two actively connected solar gears or third shafts 9 and 10 of the planetary gearsets 2 and 3 with the torque source 22 is particularly suitable because, by way of an electric motor, on the one hand, a driving effect and, on the other side, a braking effect can be exerted on the speed difference between the two output shafts of the transmission 1.

In certain operating situations, it is necessary to block the equalizing action of the transmission 1. On the one hand, this can be done by way of the electric motor 22, but over a longer period of time that is an energetically unfavorable solution. For that reason, a lock 23, made as a disk clutch, is arranged between the two third shafts 9 and 10 of the planetary gearsets 2 and 3, which in the engaged condition produces a fixed connection between the two third shafts 9 and 10 of the planetary gearsets 2 and 3 so that the two output shafts 7 and 8 are driven at the same speed.

In another embodiment not illustrated here, which corresponds essentially to the principle represented in FIG. 2 but is made without the lock between the two solar gears of the two planetary gearsets, instead of the lock, it is advantageously possible to arrange the torque source or electric motor together with a rotation direction reverser between the two solar gears of the two planetary gearsets. For this, the electric motor is designed as a motor that can be operated in oil and the transmission, according to the invention, is then a more compact system compared with the version according to FIG. 2.

Figure 3:
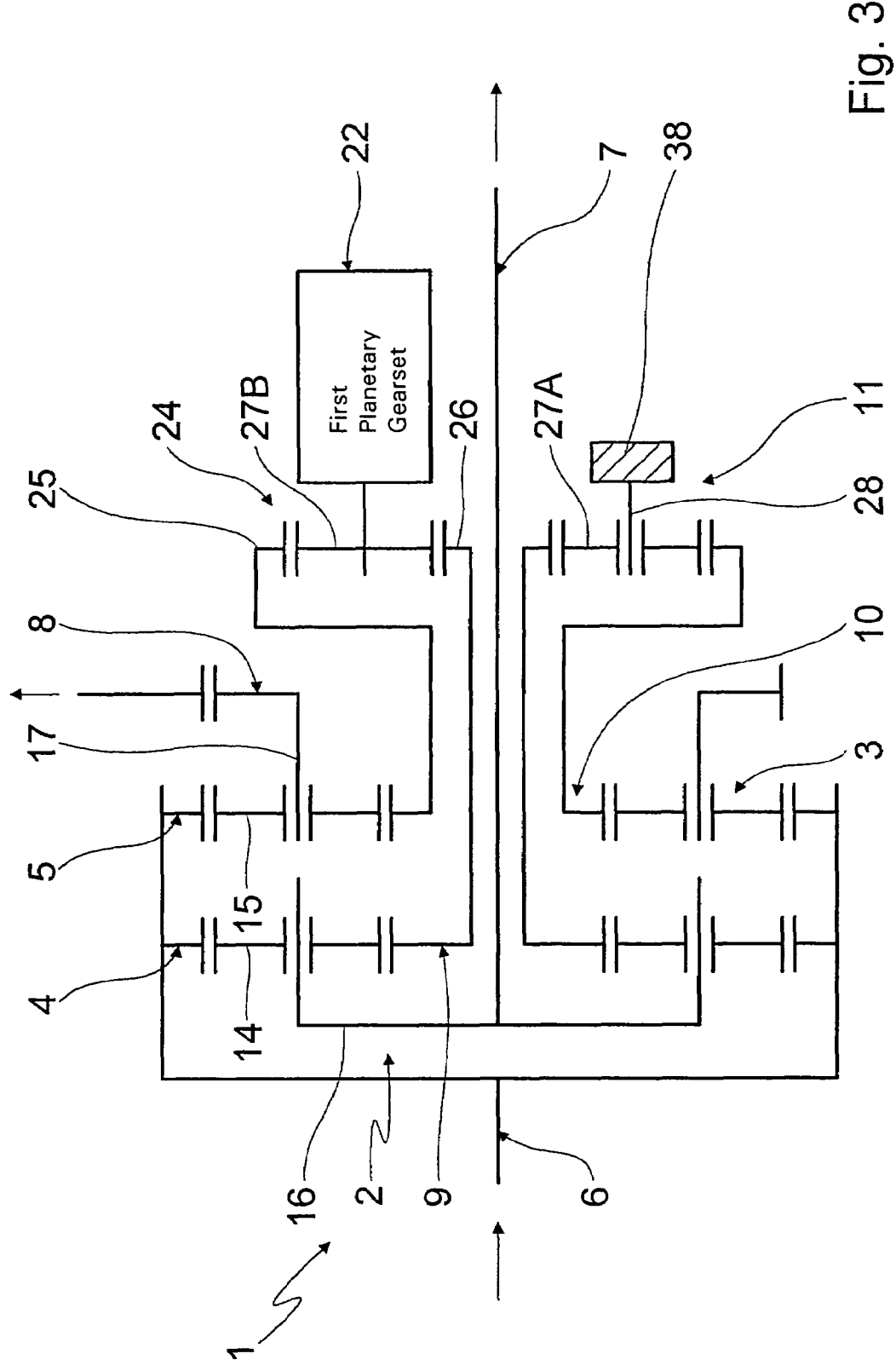
FIG. 3 is a gear layout of a transmission according to the invention designed as a longitudinal distributor differential, whose active connection comprises a third planetary gearset and an electric motor between the two planetary gearsets.

FIG. 3 shows another example embodiment of a gear layout of the transmission 1 according to the invention. The gear layout of the transmission 1, shown in FIG. 3, is a longitudinal distribution differential in which the active connection 11 between the third shaft 9 of the first planetary gearset 2 and the third shaft 10 of the second planetary gearset 3 is made with a third planetary gearset 24.

The third shaft or solar gear 10 of the second planetary gearset 3 is connected with an annular gear 25 of the third planetary gearset 24 and the third shaft or solar gear 9 of the first planetary gearset 2 is coupled to a third shaft or a solar gear 26 of the third planetary gearset 24. Several planetary gears roll between the annular gear or first shaft 25 of the third planetary gearset 24 and the solar gear 26 of the third planetary gearset 24, of which two planetary gears 27A and 27B are shown in FIG. 3.

The planetary gear 27A is mounted to rotate on a planetary carrier arranged fixed on the housing or a second shaft 28 of the third planetary gearset 24. The planetary gear 27B is in active connection with a torque source 22 made as an electric motor. The mode of action of this torque source 22 is basically the same as that of the torque source in the transmission, according to FIG. 2, so that reference can be made here to the description of FIG. 2 in that connection.

When the electric motor 22 is not energized, the drive torque introduced from the drive shaft 6 is distributed to the two output shafts 7 and 8 in accordance with a basic distribution of the transmission 1. The basic degree of distribution is determined by the ratio between the number of teeth on the annular gear 25 and the number of teeth on the solar gear 26 of the third planetary gearset 24. Depending on the torque applied by the electric motor multiplied by a factor consisting of the ratio between the number of teeth on the annular gear 4 of the first planetary gearset 2 or the annular gear 5 of the second planetary gearset 3 and the number of teeth on the solar gear 9 of the first planetary gearset 2 or the solar gear 10 of the second planetary gearset 3, this basic degree of distribution is displaced in the direction of an upper or a lower limit value of the degree of distribution.

Figure 4:
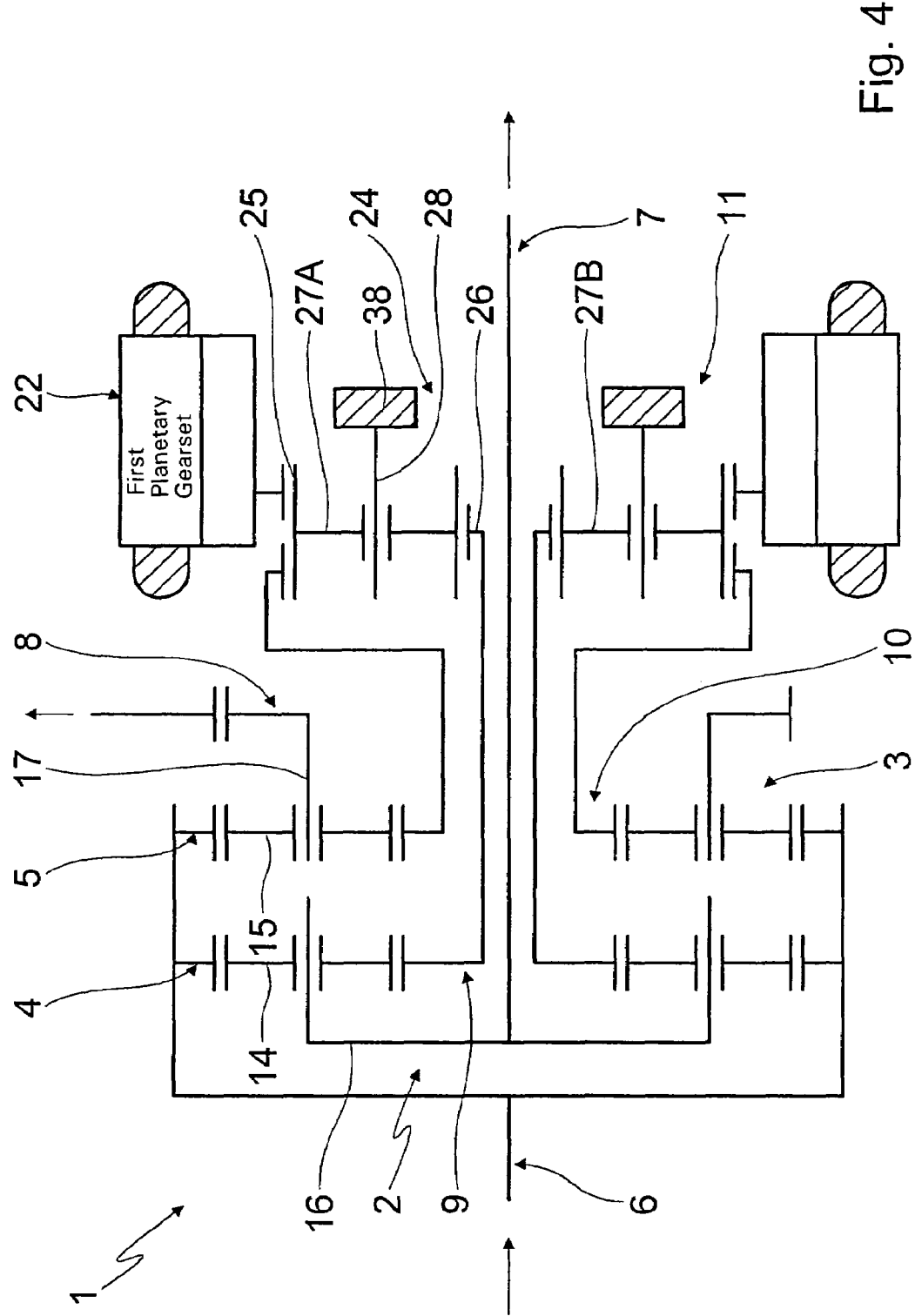
FIG. 4 is a gear layout of a transmission according to FIG. 3, in which the electric motor is coupled to an annular gear of the third planetary gearset.

FIG. 4 shows a gear layout of the transmission 1, which basically corresponds to the gear layout represented in FIG. 3. In the transmission 1, according to FIG. 4, however, the torque source 22 is coupled to the annular gear or first shaft 25 of the third planetary gearset 24 and the planetary gears 27A, 27B of the third planetary gearset 24 are mounted on the housing side. The example embodiment of the transmission, according to the invention shown in FIG. 4, has small overall dimensions in the axial direction than the transmission 1 shown in FIG. 3. To enable this, its diameter is larger than that of the system in FIG. 3, since the electric motor 22 made as a hollow shaft motor surrounds the annular gear 25 of the third planetary gearset 24.

Figure 5:
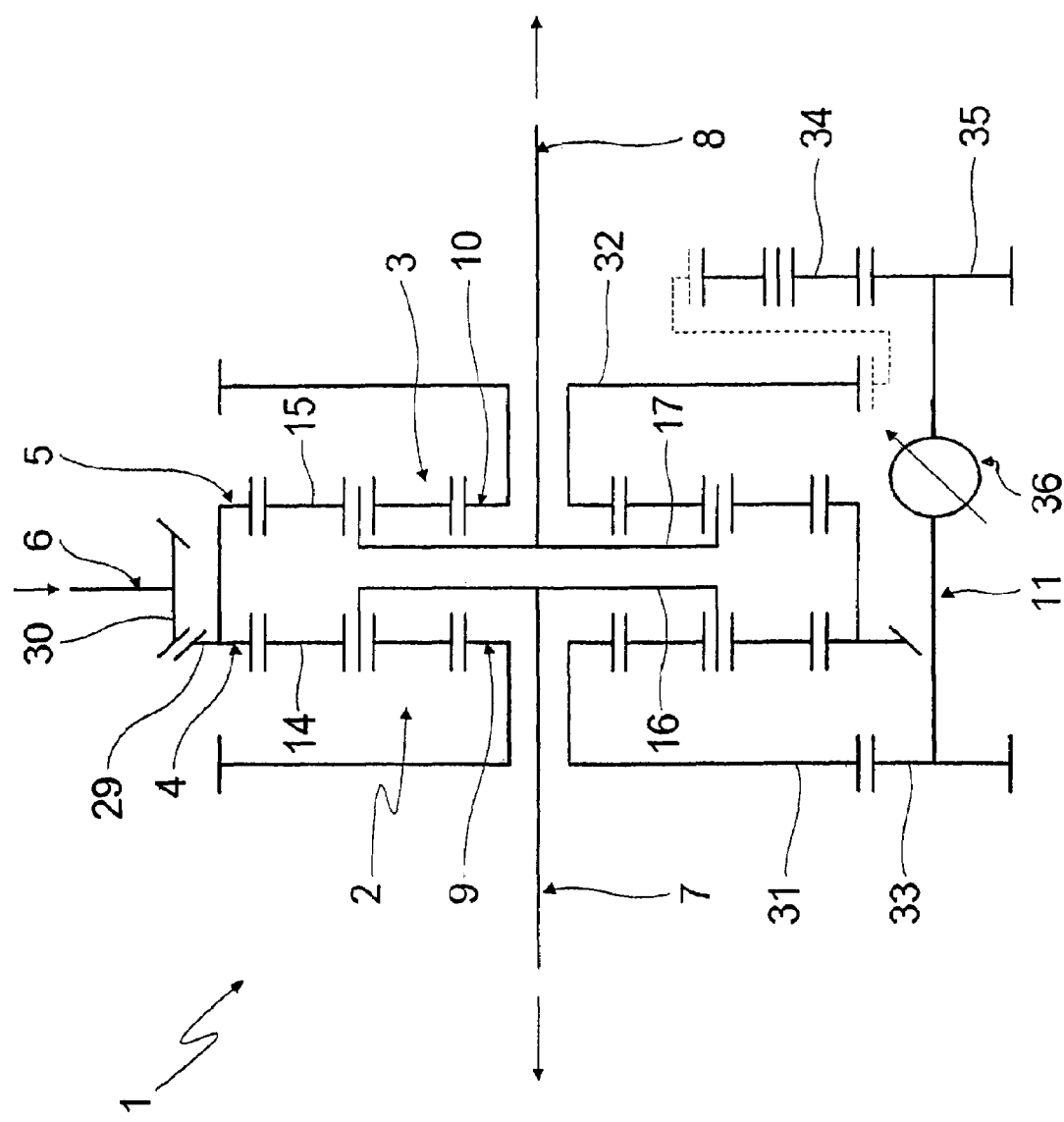
FIG. 5 is a gear layout of the transmission according to FIG. 2, in which the active connection between the first and second planetary gearsets is made with a continuously variable transmission ratio device.

Referring to FIG. 5, a gear layout of a transmission 1, according to the invention, is shown whose principle corresponds to the gear layout shown in FIG. 1. The annular gear 4 of the first planetary gearset 2 and the annular gear 5 of the second planetary gearset 3 are formed integrally and connected via a bevel gear 29 with a bevel gear 30 on the drive shaft 6.

The active connection 11, between the third shaft 9 of the first planetary gearset 2 and the third shaft 10 of the second planetary gearset 3 in this case, comprises spur gears 31 and 32 connected to the solar gears 9 and 10. Further spur gears 33, 34 and 35 that mesh with them and a continuously variable transmission ratio device 36 is arranged between the spur gears 33 and 35. This ratio device 36 is in this case made as a tension means transmission, such as a belt-type CVT (Continuously Variable Transmission). Obviously, the continuously variable ratio device 36 can also be made as a ball variator, a Beier variator or suchlike.

Integration of the continuously variable ratio device 36 in the active connection 11 enables the degree of distribution of the drive torque between the two output shafts 7 and 8 of the transmission 1, starting from a basic degree of distribution, to be varied between an upper and a lower limit value by corresponding adjustment of the transmission ratio of the ratio device 36.

Figure 6:
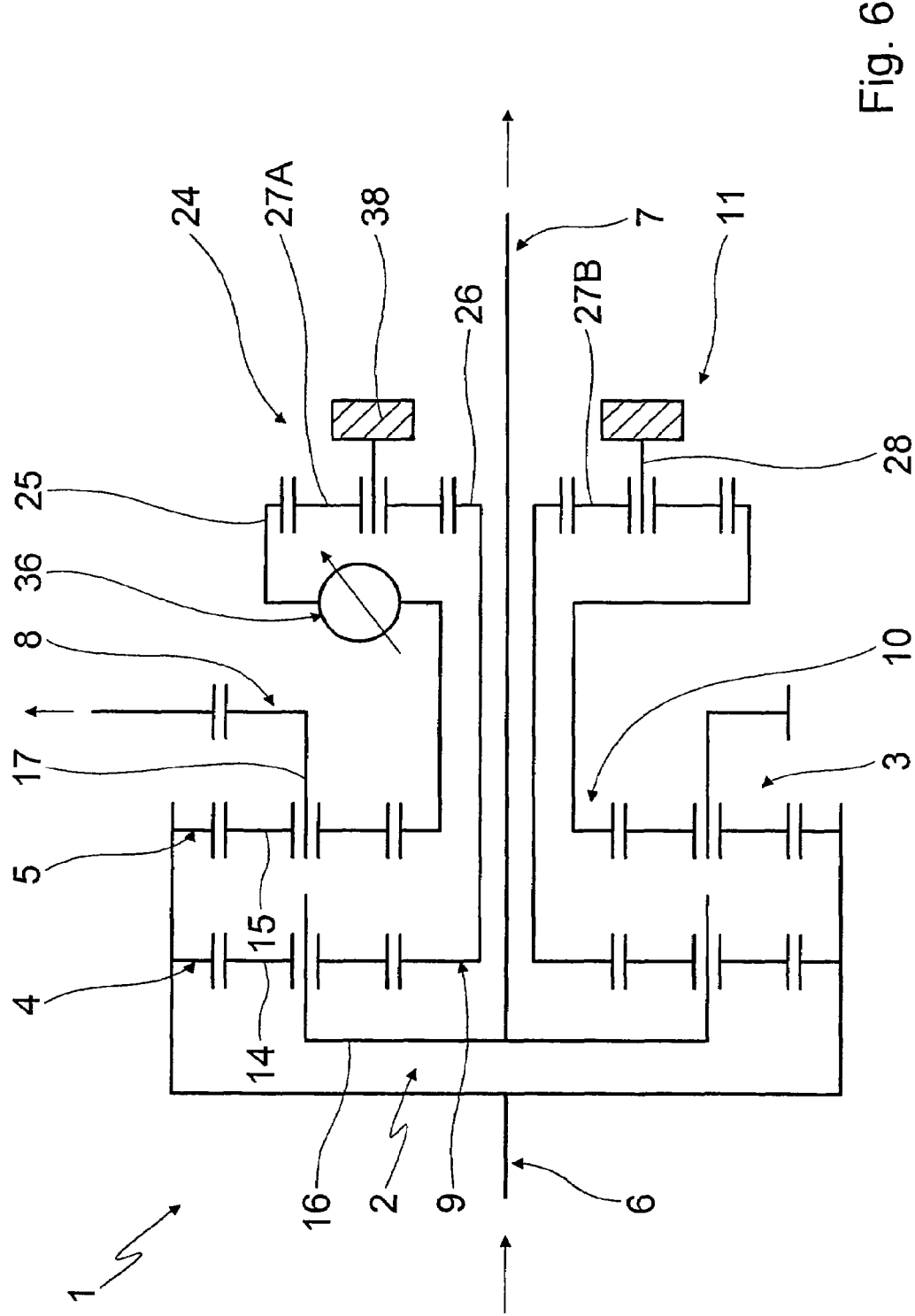
FIG. 6 is a gear layout of the transmission according to the invention, in which the active connection is made with a continuously variable transmission ratio device and a third planetary gearset.
Figure 7:
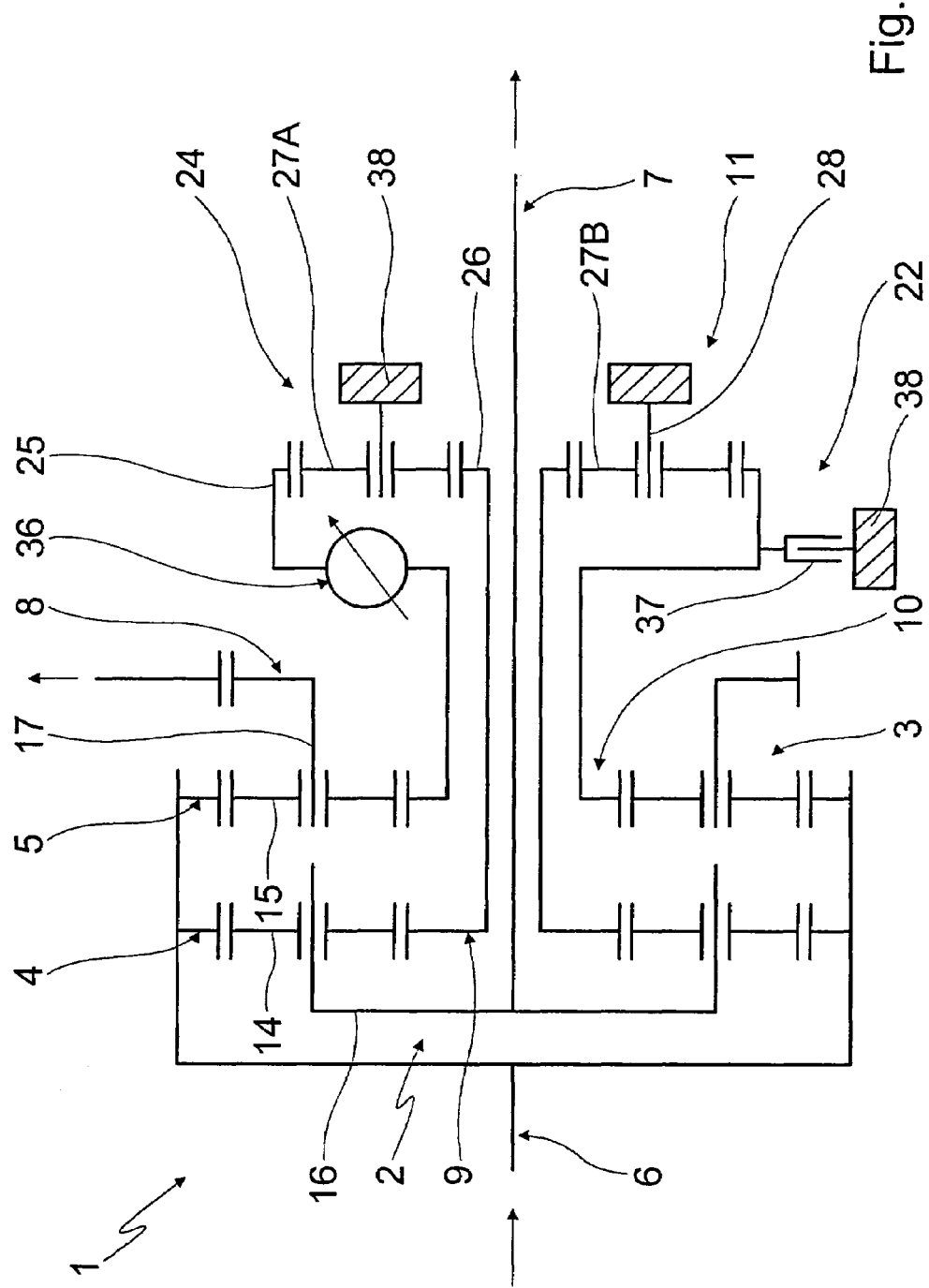
FIG. 7 is a gear layout of the transmission according to FIG. 6, in which a brake is associated with an annular gear of the third planetary gearset.
Figure 8:
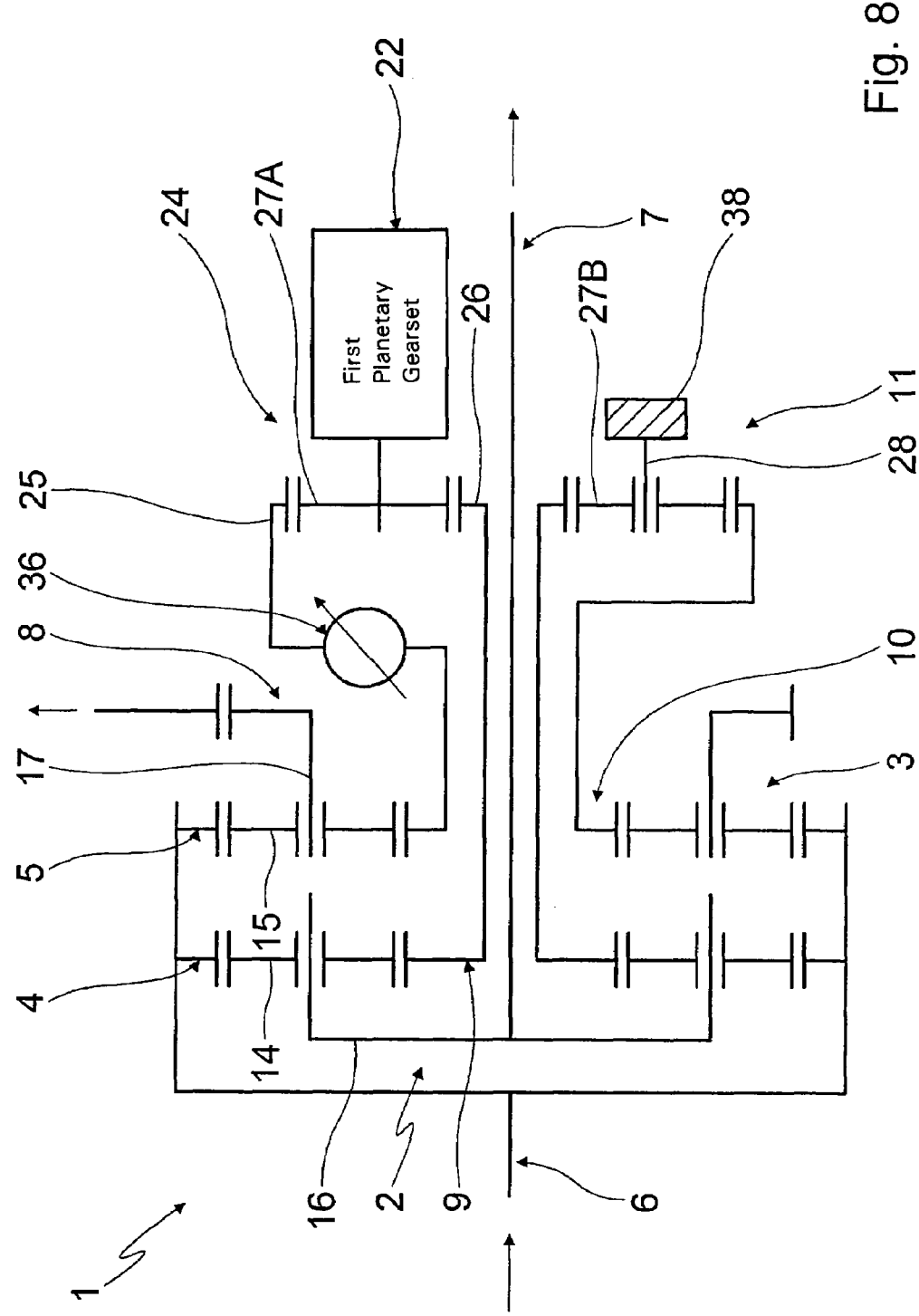
FIG. 8 is a gear layout of the transmission according to FIGS. 6 and 7, in which an electric motor is associated with a planetary gear wheel of the third planetary gearset.

FIGS. 6 to 8 show three gear layouts of further embodiment variation of the transmission device, according to the invention, based on the gear layout represented in FIG. 3. Here, the active connection 11 between the third shaft 9 of the first planetary gearset 2 and the third shaft 10 of the second planetary gearset 3 is made with the third planetary gearset 24 with planetary gears 27A and 27B mounted fixed on the housing and with a continuously variable ratio device 36. In these variant embodiments of the transmission 1, according to the invention, the basic degree of distribution between the two output shafts 7 and 8 is determined by the transmission ratio of the third planetary gearset 24, which can be displaced between an upper and a lower limit value of the degree of distribution by corresponding adjustment of the transmission ratio of the ratio device 36, as necessary, and in relation to the operating status.

The transmission gear layout shown in FIG. 7 differs from that shown in FIG. 6 in that the annular gear 25 of the third planetary gearset 24 can be braked by a brake 37 in this case made as a disk brake. The brake 37 also constitutes a torque source by way of an adjustable blocking action, known from axle differentials of the prior art, and provided in order to prevent an equalizing effect of such axle differentials, can be made continuously variable. In advantageous further developments of the transmission 1, the brake 37 can also be made as a conical brake, a claw brake, a belt brake or suchlike.

The versions of the torque source described above, i.e., the electric motor or brake, have the advantage that they can be arranged in the transmission 1 fixed to the housing. This enables the transmission as a whole to be of a simple design. That is because of the fact that the support of the torque source 22, which in the version of the transmission 1 according to FIG. 8, is made as an electric motor that engages with the planetary gear 27A of the third planetary gearset 24, can be effected in the transmission 1 without additional design measures which enable rotary transfer of force, pressure or current. This means that a hydraulic, electromagnetic or other suitable actuator mechanism for the variable distribution of a drive torque between the two output shafts 7 and 8 of the transmission 1 is arranged in the transmission housing without rotating in the transmission 1.

Figure 9:
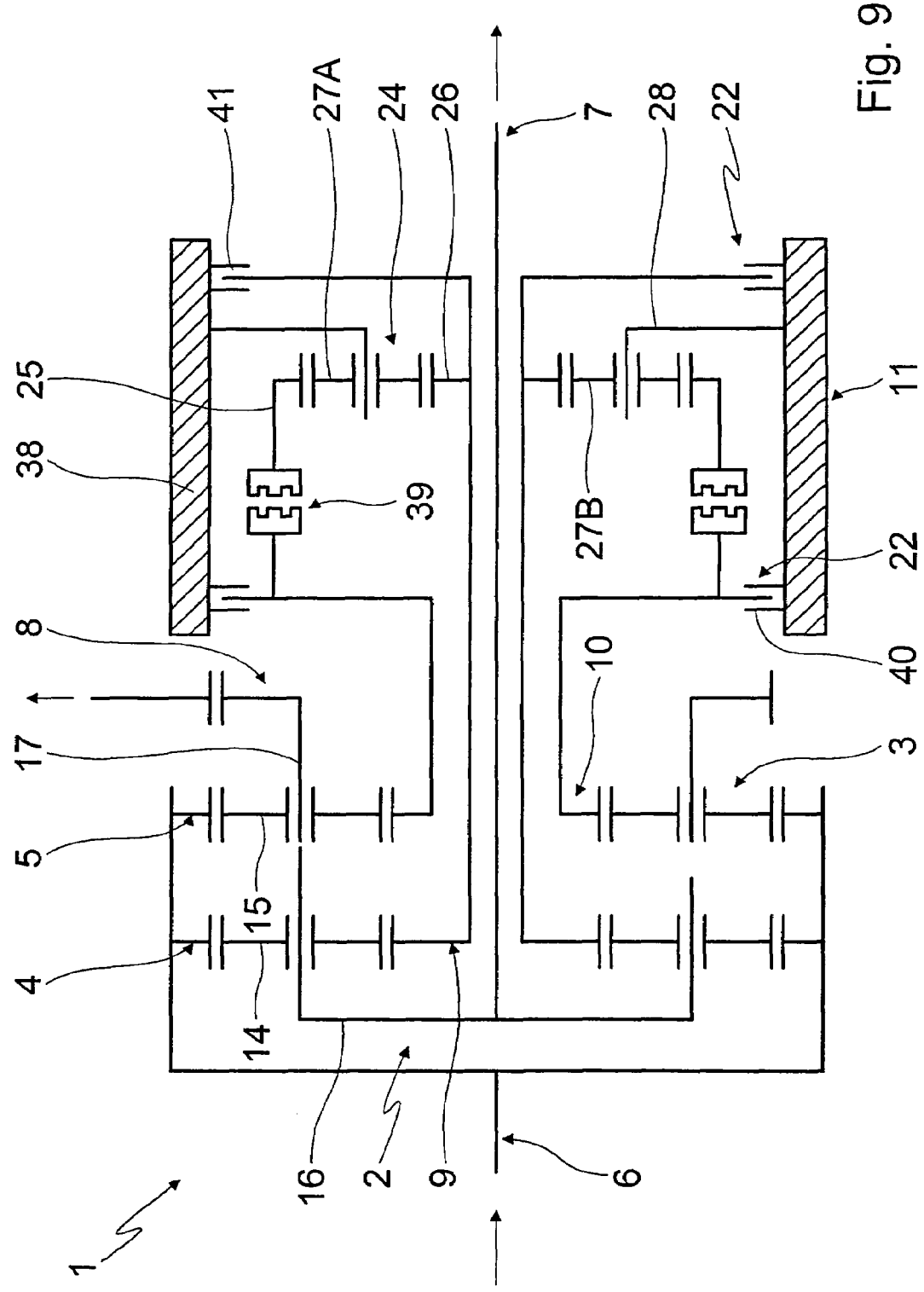
FIG. 9 is a gear layout of the transmission according to FIG. 3, in which the third planetary gearset of the active connection can be engaged by way of a claw-type clutch and in which the active connection is, in addition, made with two brakes.

Referring to FIG. 9, a gear layout of a further embodiment of the transmission 1, according to the invention, is shown in which the active connection 11 has two power paths parallel to one another. A first power path is formed with the third planetary gearset 24 which can, in this case, be engaged in the force flow of the transmission 1 by way of a claw clutch 39. The second power paths is found by two brakes 40, 41, associated respectively with the solar gear 9 of the first planetary gearset 2 and the solar gear 10 of the second planetary gearset 3, which fix the two solar gears 9 and 10 of the planetary gearsets 2 and 3 relative to the transmission housing when they are engaged. When the brakes 40 and 41 are engaged, the equalizing action of the transmission 1 is completely suppressed and the two output shafts 7 and 8 run at the same speed.

When the claw clutch 39 is disengaged, a degree of distribution of the drive torque between the two drive output shafts 7 and 8 can be varied between 0% and 100% by controlling the two brakes 40 and 41 in the manner to be described with reference to FIG. 10. To reduce power loss in each case, one of the brakes 40 or 41 is preferably operated in the engaged condition and the respective other brake 41 or 40 is operated between a completely open and a completely engaged condition.

Figure 10:
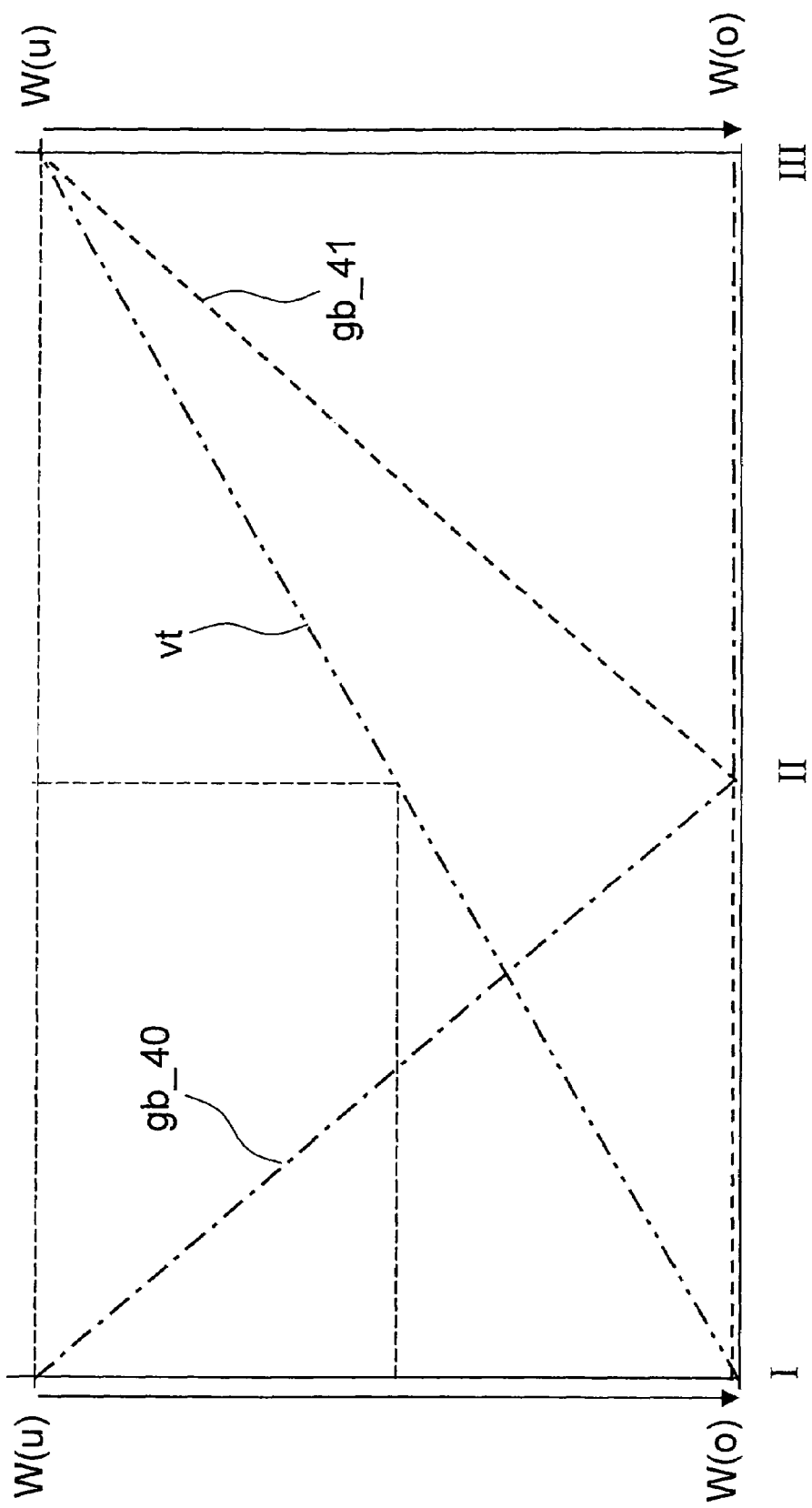
FIG. 10 is a graphic representation of a relationship between the transfer capacities of the brakes shown in FIG. 9 and a degree of distribution of a drive torque between two drive output shafts of the transmission according to the invention.

FIG. 10 shows three very schematic graphs, a first one gb_40 of which represents the variation of a transfer capacity of the first brake 40 between a lower limit value W(u) and an upper limit value W(o). Another graph gb_41 shows the variation of the transfer capacity of the second brake 41, which corresponds with the graph gb_40 of the first clutch 40. A third graph vt is a graphical representation of the degree of distribution of the drive torque between the two output shafts 7 and 8 as a function of the variations gb_40 and gb_41 of the transfer capacities of the brakes 40 and 41.

At a Point I where the transfer capacity of the first brake 40 corresponds to the lower limit value W(u), essentially no torque is supported in a housing 38 of the transmission 1 by the first brake. At the same time, the transfer capacity of the second brake 41 is set at the upper limit value W(o), at which the second brake is fully engaged. In this operating condition of the two brakes 40 and 41, all the drive torque from a drive engine or the transmission output torque of a main transmission is delivered to the output shaft 7 connected to the first planetary gearset 2.

In the range between Point I and Point II in the diagram of FIG. 10, the transfer capacity of the second brake 41 undergoes controlled and regulated adjustment in such a manner that the second brake 41 is engaged. At the same time, the transfer capacity of the first brake 40 is changed from its lower limiting value W(u) at which it transfers no torque to the housing 38 of the transmission, towards the direction of the upper limiting value W(o) of the transfer capacity, at which the first brake 40 is also engaged. This means that the transfer capacity of the first brake 40 is steadily increased in the range between Point I and Point II. In consequence, the degree of distribution of the drive torque between the two output shafts 7 and 8 changes, since as the transfer capacity of the first brake 40 increases, an increasing fraction of the drive torque is transferred to the output shaft 8 connected to the second planetary gearset 3.

In an operating condition of the transmission 1 which corresponds to Point II of the diagram in FIG. 10, when both brakes 40 and 41 are engaged, there is a defined degree of distribution of the drive torque between the two output shafts 7 and 8.

In a range between Point II and Point III in the FIG. 10 diagram, the transfer capacity of the first brake 40 undergoes regulated and controlled adjustment in such a manner that the first brake 40 is engaged. At the same time, starting from the upper transfer capacity limiting value W(o) at which the second brake 41 is engaged, the transfer capacity of the second brake 41 is reduced steadily towards the lower limiting value W(u) of the transfer capacity at which the second brake 41 essentially supports no torque in the housing 38 of the transmission 1.

As can be seen in FIG. 10, the variation vt of the degree of distribution of the drive torque between the two output shafts 7 and 8 increases with progressive reduction of the transfer capacity of the second brake 41 up to its maximum value at Point III, where the drive torque is transferred completely to the output shaft 8 connected to the second planetary gearset 3.

The use of the two controllable and related brakes 40 and 41 makes it possible to distribute the drive torque between the two output shafts 7 and 8 as necessary, which continuous variability and in an efficiency-optimized manner. The control and regulation of the two brakes, in accordance with the invention as described above, improves efficiency because one of the two brakes 40 or 41 is operated without slip, while the other respective brake 41 or 40 is operated with a speed difference that corresponds to the operating-situation-dependent drive power distribution in the drive train. This operating strategy minimizes frictional losses while retaining all the advantages of an all-wheel drive controlled by frictional shift elements.

In addition, there is the possibility of synchronizing the claw clutch 39 by way of the two brakes 40, 41 and incorporating the third planetary gearset 24 in the force flow of the transmission 1 so that there is a preferred basic degree of drive torque distribution between the two output shafts 7 and 8, which is available with low losses apart from the frictional losses occurring in the teeth of the third planetary gearset 24.

FIGS. 11 to 15 show schematic representations of a number of embodiment variations of a drive train 42 of a motor vehicle, in which, for the longitudinal or transverse distribution of the drive torque in the drive train 42, one of the embodiments, described earlier of the transmission device 1 according to the invention, is combined with various other devices, represented only in pictograph form, for distributing a drive torque in the longitudinal direction of a vehicle between two driven vehicle axles or in the transverse direction of the vehicle between two drive wheels of a vehicle axle. With the help of the device for distributing a drive torque in the drive train, it should be possible especially in critical driving situations, to produce a suitable distribution of the drive torque, especially in critical driving situations so that propulsive traction is maintained at the driven axles or drive wheels of a vehicle or so that drive-stabilizing action can be taken, if necessary.

The drive train 42, shown in FIGS. 11 to 15, each have two driven vehicle axles 43, 44. In the present case, the axle 43 is a front axle and the axle 44 is a rear axle of a vehicle.

Figure 11:
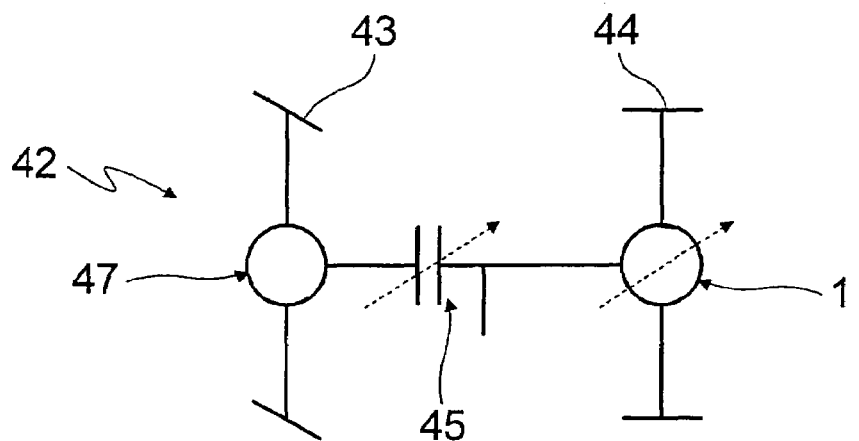
FIG. 11 is a schematic representation of a drive train of an all-wheel vehicle in which a clutch is provided for the longitudinal distribution of a drive torque between two driven vehicle axles and a transmission made according to the invention is provided for the transverse distribution of the fraction of the drive torque delivered to a driven vehicle axle.

Referring to FIG. 11, the drive train 42 comprises a continuously adjustable clutch 45 for the longitudinal distribution of a drive torque between the two vehicle axles 43 and 44; an open differential 46 of known type for transverse distribution at the font axle 43, and a transmission device 1 for transverse distribution at the rear axle 44 configured, according to the invention, or an overlap transmission.

Figure 12:
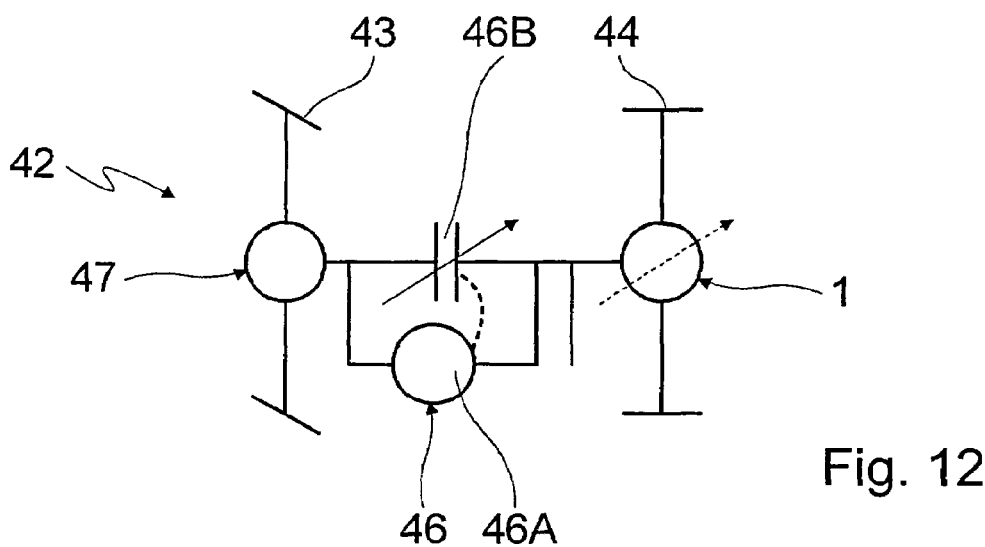
FIG. 12 is another example embodiment of a drive train in which a transmission according to the invention is provided for transverse distribution.

The drive train 42 in FIG. 12 differs from the example embodiment of the drive train 42 in FIG. 11 in that, for the longitudinal distribution of a drive torque between the front axle 43 and the rear axle 44, the device 46 is provided which, when there is a speed difference between the front axle 43 and the rear axle 44, builds up a hydraulic pressure by way of a pump system 46A with which frictional elements of a disk clutch 46B that can be brought into mutual frictional engagement can be acted upon in such a manner that a speed-difference-reducing torque can be applied to the two respective axles 43 and 44 while, when the speeds are equal, the pressure build-up is virtually zero.

Figure 13:
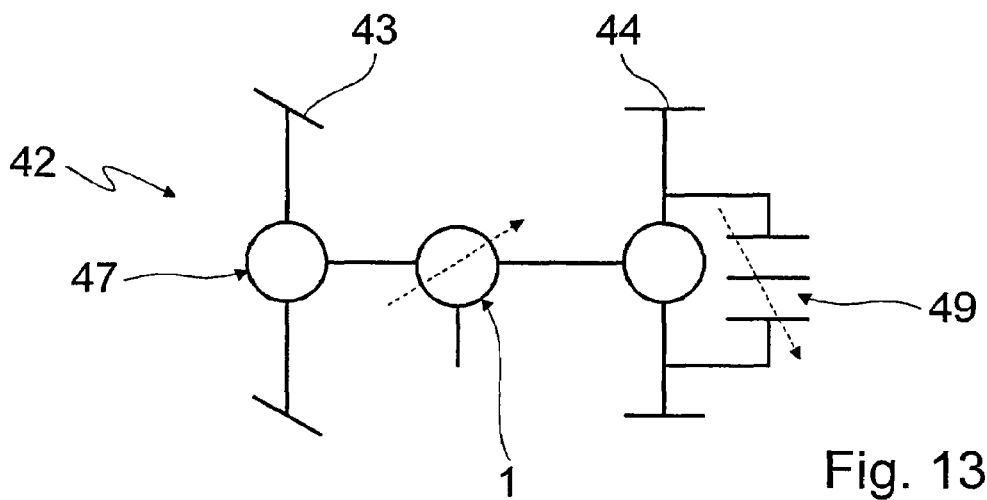
FIG. 13 is a third example embodiment of a drive train in which a transmission according to the invention is provided for longitudinal distribution and a controlled differential lock for transverse distribution.

In the drive train 42 of FIG. 13, the longitudinal distribution of the drive torque between the front axle 43 and the rear axle 44 is effected by a transmission 1 configured, according to the invention, and the transverse distribution of the fraction of the drive torque supplied to the front axle 43 by an open differential 47. The transverse distribution of the fraction of the drive torque supplied to the rear axle 44 is effected by a controlled differential lock 49 of a known type.

Figure 14:
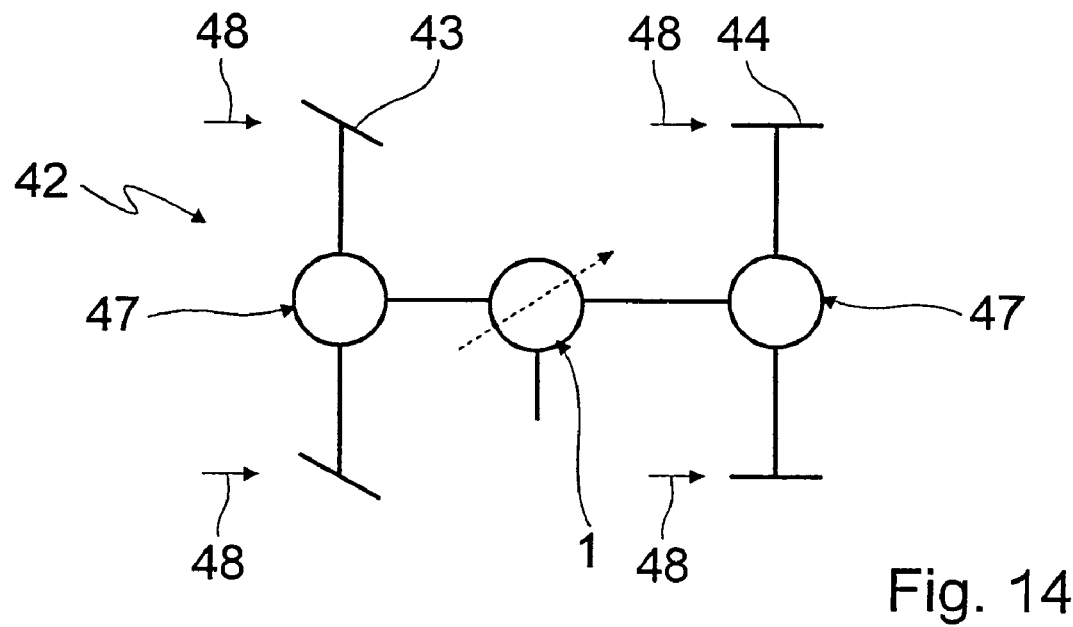
FIG. 14 is a fourth example embodiment of a drive train in which a drive torque is distributed longitudinally by a transmission according to the invention and transversely by an open differential.

Referring to FIG. 14, a drive train 42 is shown in which, for driving stabilization and free torque distribution between the front and rear axles, an overlap transmission 1 configured according to the invention is integrated, which is combined with brake engagement applicable on individual wheels. The brake engagement is symbolically represented graphically in FIG. 14 by the arrow indexed 48. For transverse distribution, open differentials are provided in the power trains of each of the vehicle axles 43 and 44.

Figure 15:
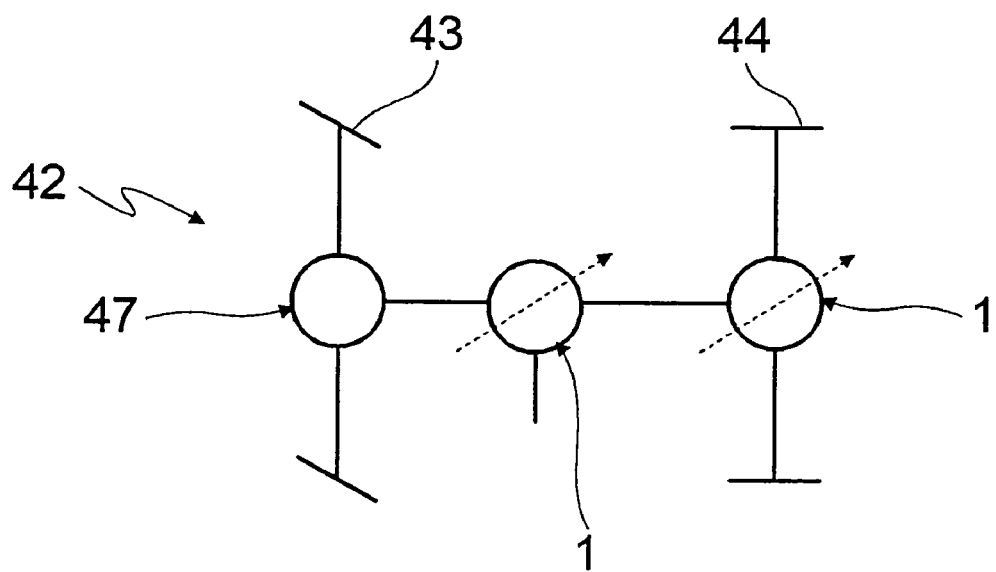
FIG. 15 is a fifth example embodiment of a drive train in which both the longitudinal and the transverse distribution of a drive torque are effected by a transmission according to the invention.

In the drive train represented in FIG. 15, an overlap transmission configured according to the invention is arranged both in the longitudinal drive train and in the power train of the rear axle 44, this providing the advantageous possibility of continuously varying a degree of distribution of the drive torque between the two vehicle axles 43 and 44, as necessary, and depending on the operating situation, and distributing the fraction of the drive torque delivered to the rear axle 44 between the two drive wheels of that axle, again as necessary, and depending on the operating situation. The fraction of the drive torque delivered to the front axle 43 is distributed by an open differential.

Clearly, it is open to the judgment of those with knowledge of the subject to configure the drive train of a vehicle in the longitudinal power train and in the power trains in the transverse direction of the vehicle of both vehicle axles with a transmission device according to the invention. This provides the advantageous possibility of adapting the drive torque between all the drive wheels of the drive train in accordance with the driving situation at the time.

REFERENCE NUMERALS 1 transmission device, transmission
2 first planetary gearset
3 second planetary gearset
4 first shaft of the first planetary gearset, annular gear
5 first shaft of the second planetary gearset, annular gear
6 drive input shaft
7 second shaft of the first planetary gearset, drive output shaft
8 second shaft of the second planetary gearset, drive output shaft
9 third shaft of the first planetary gearset
10 third shaft of the second planetary gearset
11 active connection
12 first spur gear
13 second spur gear
14 planetary gear wheels of the first planetary gearset
15 planetary gear wheels of the second planetary gearset
16 web of the first planetary gearset
17 web of the second planetary gearset
18 third spur gear
19 fourth spur gear
20 fifth spur gear
21 sixth spur gear
22 torque source
23 lock
24 third planetary gearset
25 first shaft, annular gear of the third planetary gearset
26 third shaft, solar gear of the third planetary gearset
27A,B Planetary gears of the third planetary gearset
28 second shaft, web of the third planetary gearset
29 bevel gear
30 bevel gear of the drive shaft
31-35 spur gear
36 continuously variable transmission ratio device
37 brake
38 housing of the transmission
39 claw-type clutch
40 first brake
41 second brake
42 drive train
43 vehicle axle, front axle
44 vehicle axle, rear axle
45 controlled clutch
46 device
46A pump system
46B disk clutch
47 open differential
48 arrow
49 controlled differential lock
vt degree of distribution of the drive torque between the output shafts
gb_40 variation of the transfer capacity of the first brake
gb_41 variation of the transfer capacity of the second brake
W(u) lower limit value of the transfer capacity of the brakes
W(o) upper limit value of the transfer capacity of the brakes

The invention claimed is:

1. A transmission (1) for distributing a drive torque to at least first and second drive output shafts (7, 8) with at least first and second planetary gearsets (2, 3) having at least first, second and third shafts such that a respective first shaft (4 or 5) of the first and the second planetary gearset (2 or 3) is drivingly coupled to a drive input shaft (6) and a respective second shaft of each planetary gearset (2 or 3) constitutes one of the first and the second drive output shafts (7 or 8), and the third shaft (9 or 10) of the first planetary gearset (2 or 3) is connected to the third shaft (10 or 9) of the second planetary gearset (3 or 2) by a controllable and regulated active connection (11):

wherein if a rotation speed difference occurs between the output shafts (7, 8), a first variable speed-difference-changing torque is applied by the active connection (11) to the third shaft (10 or 9) and a second variable speed-difference-changing torque is applied by the active connection (11) to the other third shaft (9 or 10) for varying a degree of distribution of the drive torque, between the first and the second output shafts (7 and 8) between an upper limit and a lower limit value by an adjustment of a transmission ratio of a continuously variable ratio device (36).

2. A transmission (1) for distributing a drive torque to at least first and second drive output shafts (7, 8) via at least first and second planetary gearsets (2, 3) each having at least first, second and third shafts, such that the first shaft (4 or 5) of the first and the second planetary gearset (2 or 3) is connected to a drive input shaft (6) and the second shaft of each of the first and the second planetary gearsets (2 or 3) constitutes one of the first and the second drive output shafts (7 or 8), and the third shaft (9 or 10) of the first planetary gearset (2 or 3) is connected to the third shaft (10 or 9) of the second planetary gearset (3 or 2) by a controllable and regulated active connection (11), and an operating-status-dependent torque of one of the third shafts (9 or 10) is supported as a function of an operating status of the respective other of the third shafts (10 or 9) actively connected thereto via the active connection (11) wherein if a rotation speed difference occurs between the first and the second output shafts (7, 8), a speed-difference-changing torque is applied by the active connection (11) at least for a time to the at least first and second planetary gearsets (2, 3) such that the active connection (11) is a continuously variable transmission (36) for varying a degree of distribution of the drive torque, between the first and the second output shafts (7 and 8) between an upper limit and a lower limit value by an adjustment of a transmission ratio of the continuously variable transmission (36).

3. A transmission (1) for distributing drive torque from a drive input shaft (6), the transmission comprising:

a continuously variable transmission (36) coupled to a first gear (33) and a second gear (35) for controlling transmission of drive to and from the first and the second gears (33, 35);

a first planetary gearset (2) having a first shaft (4), a second shaft (7) and a third shaft (9);
  the first shaft (4) being drivingly coupled with the drive input shaft (6);
  the first gear (33) transmitting drive between the third shaft (9) of the first planetary gearset (2) and the continuously variable transmission (36);
  the second shaft (7) being a transmission output shaft and being coupled to both the first shaft (4) and the third shaft (9) of the first planetary gearset (2);
a second planetary gearset (3) having at least a fourth shaft (5), a fifth shaft (8) and a sixth shaft (10);
  the fourth shaft (5) being drivingly coupled with the drive input shaft (6);
  the second gear (35) transmitting drive between the sixth shaft (10) of the second planetary gearset (3) and the continuously variable transmission (36);
  the fifth shaft (8) being a transmission output shaft and being coupled to both the fourth shaft (5) and the sixth shaft (10) of the second planetary gearset (3); and
the third shaft (9) of the first planetary gearset (2) being coupled, via the continuously variable transmission (36), with the sixth shaft (10) of the second planetary gearset (3) for varying a degree of distribution of the drive torque, between the first and the second output shafts (7 and 8) between an upper limit and a lower limit value by a adjustment of a transmission ratio of the continuously variable transmission (36) such that upon a rotational difference between the second shaft (7) and the fifth shaft (8), a first variable drive is applied by the continuously variable transmission (36), via the first gear (33) to the second shaft (7) and a second variable drive is applied by the active connection (11) via the second gear (35) to the fifth shaft (8).

* * * * *